United States Patent [19]

Kaptein

[11] Patent Number: 5,295,641
[45] Date of Patent: * Mar. 22, 1994

[54] PROPELLER BLADE POSITION CONTROLLER

[75] Inventor: Dick Kaptein, Alphen A/D Rijn, Netherlands

[73] Assignee: Fokker Aircraft B.V., Schiphol, Netherlands

[*] Notice: The portion of the term of this patent subsequent to Sep. 29, 2009 has been disclaimed.

[21] Appl. No.: 866,563

[22] Filed: Apr. 10, 1992

Related U.S. Application Data

[62] Division of Ser. No. 600,445, Oct. 19, 1990, Pat. No. 5,150,855.

[30] Foreign Application Priority Data

Oct. 20, 1989 [GB] United Kingdom ............... 8923643

[51] Int. Cl.$^5$ ............................................. B64D 31/12
[52] U.S. Cl. ............................. 244/1 N; 244/66; 416/33; 381/71; 181/206; 364/574
[58] Field of Search ............... 244/1 N, 118.5, 129.1; 416/33, 34, 56; 381/71; 181/206; 364/574, 508, 474.22, 431.01, 494; 415/119; 64/39.21, 281

[56] References Cited

FOREIGN PATENT DOCUMENTS 0252647 6/1987 European Pat. Off. ............. 244/1 N
2211635 10/1987 United Kingdom ............... 244/1 N

OTHER PUBLICATIONS

Elliott et al, WO87/07974, Dec. 30, 1987.

*Primary Examiner*—Galen L. Barefoot
*Attorney, Agent, or Firm*—Handal & Morofsky

[57] ABSTRACT

System for reducing vibrations in the cabin of an aircraft driven by two or more propellers each having n blades (n being an integer equal or larger than 2) of which the relative phase angle can be adjusted, said system comprising synchrophase means for adjusting said relative phase angle such that a predetermined relative phase angle is maintained. The system furthermore comprises means supplying information about the vibration level at one or more positions within the cabin or thereto related information and for generating a thereto corresponding level signal, and a control unit which in response to said level signal supplies an error signal to the synchrophase means causing the synchrophase means to adjust the blades of the various propellers such that a new relative phase angle is maintained which differs m.($2\pi/n$) radians (m being an integer) from the previous relative phase angle.

13 Claims, 4 Drawing Sheets

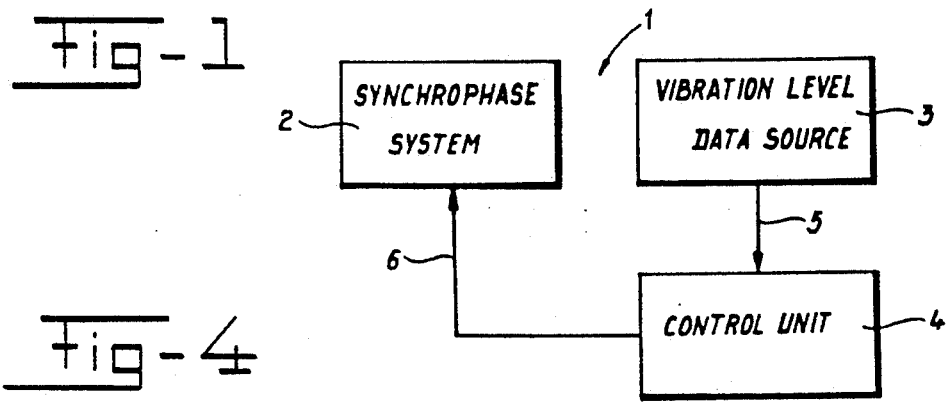
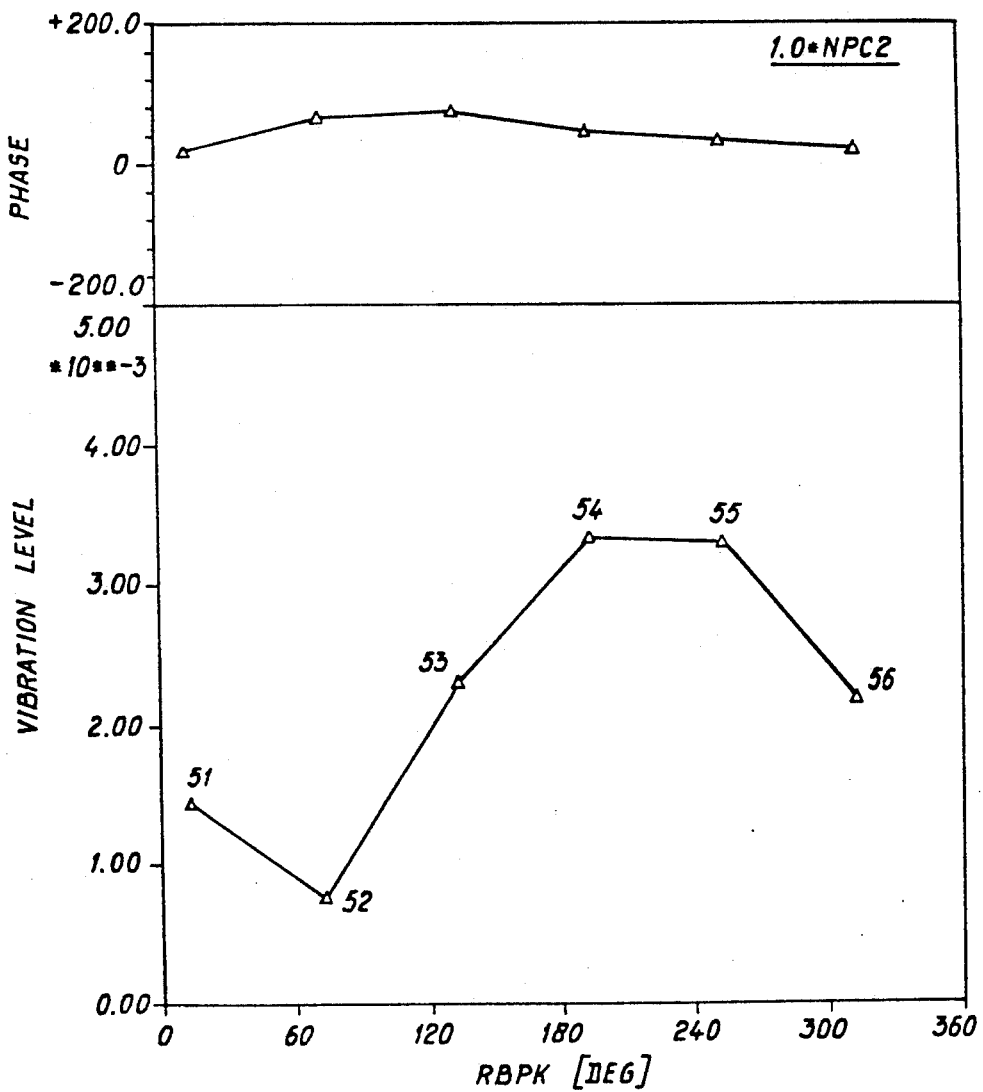

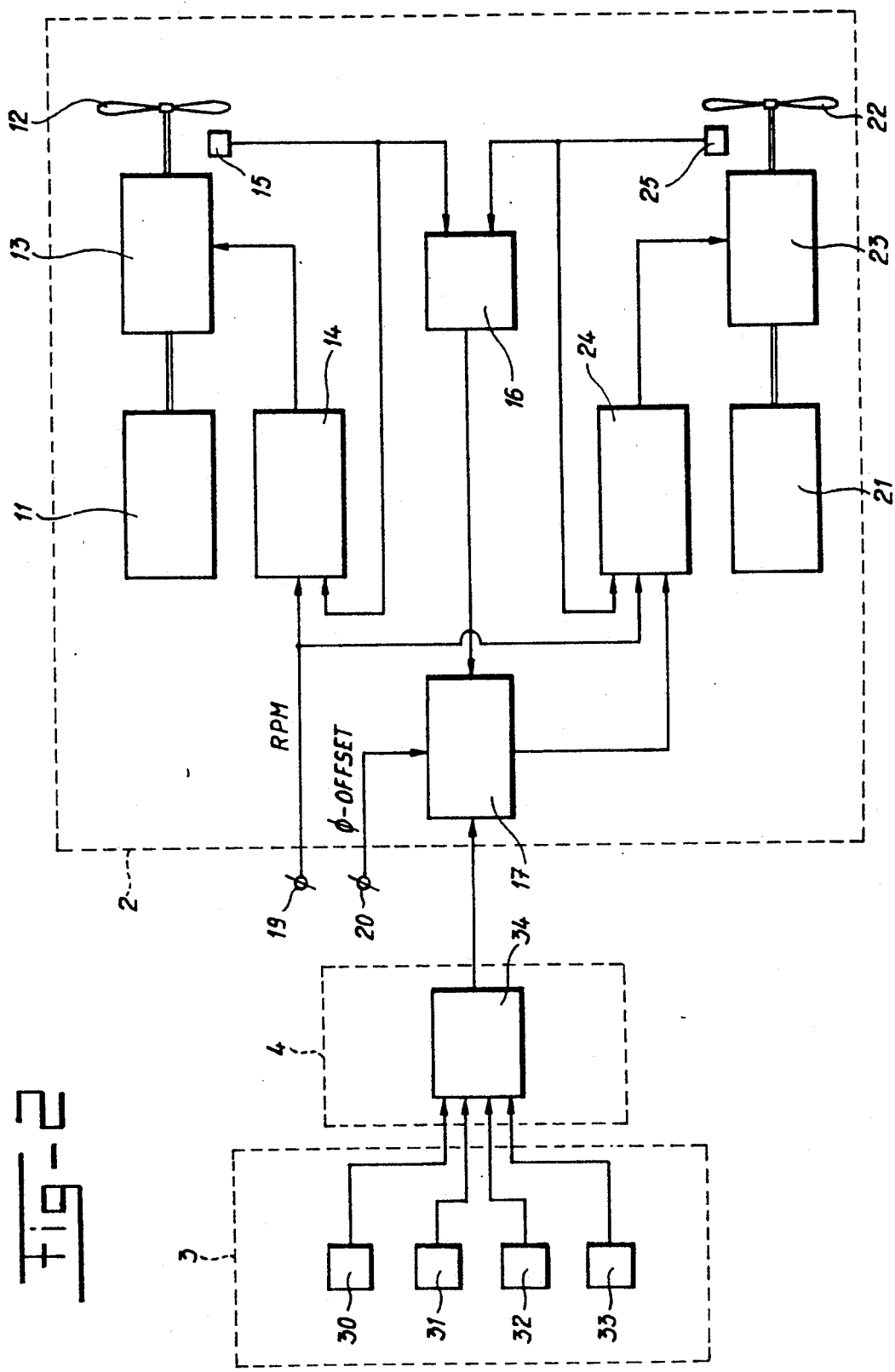

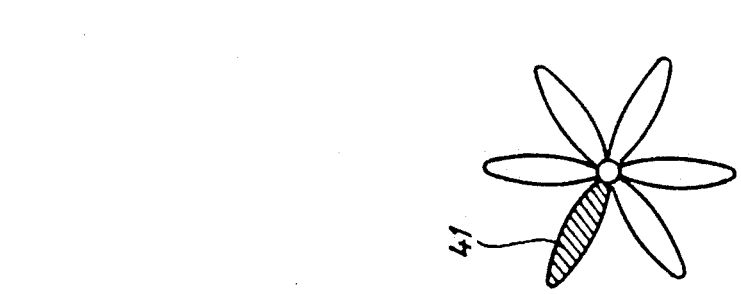
Fig-3
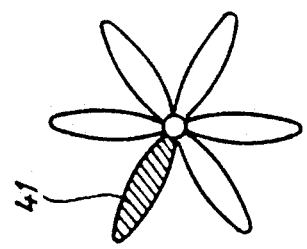
56
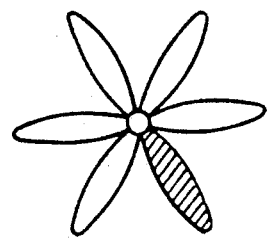
55
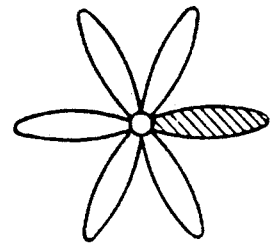
54
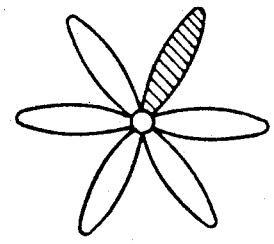
53
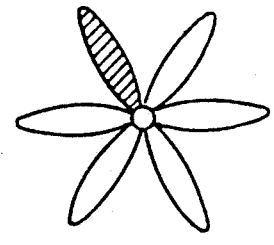
52
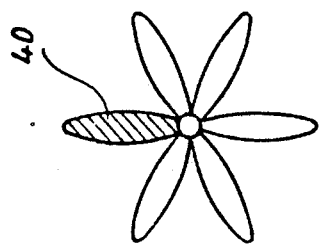
PROPELLER 12
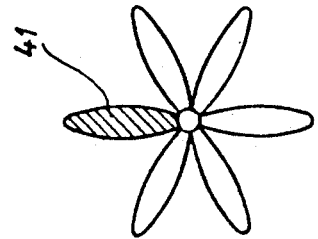
PROPELLER 22
51

PROPELLER BLADE POSITION CONTROLLER

This application is a division of application Ser. No. 07/600.445, filed Oct. 19, 1990 now U.S. Pat. No. 5,150,855.

The invention relates to a system for reducing vibrations in cabin of an aircraft driven by two or more propellers each having n blades (n being an integer equal or larger than 2) of which the relative phase angle can be adjusted, said system comprising synchrophase means for adjusting said relative phase angle such that a predetermined relative phase angle is maintained.

A source of discomfort for passengers and crew of propellerdriven aircraft is the action of the various engines and propellers generating annoying vibrations and dominant noise in the cabin and cockpit. A propeller with a rotational speed N and a number of blades n, generates excitation forces having frequencies of N, Hz and nN Hz with harmonics. Vibrations of this nature have regular and irregular patterns. In order to reduce the vibration and internal noise to an appreciable level for crew and passengers, modern propeller driven multi engined aircraft utilize all kind of energy absorbing, vibration isolating and reactive force devices to reduce the transmission of mechanical vibrations from the propulsion units to the fuselage.

For example, isolators are often mounted in the connection between engine and engine support to isolate the engine/propeller combination from objectionable dynamic foundation displacements, and/or isolate the aircraft structure from objectionable dynamic forces from the engine/propeller combination. Such apparatus include elastomeric and metal spring elements for dampening vibration in one or more directions.

Yet another method to reduce propeller harmonics in particular is the use of propeller synchrophase systems. Examples of such systems are given by U.S. Pat. Nos. 2,847,617; 2,877,855; 2,878,427; 3,007,529; 3,589,832; 4,245,955; 4,653,981; 4,659,283 and 4,703,908; European application EP 0,322,343; Canadian Patents 0,664,628 and 0,472,689 and the UK Patent 2,211,635. The object of these prior art systems for propeller synchrophasing is to maintain an accurate positional or phasic agreement between one blade of a first propeller, which is named the master, and any blade of the other propeller(s), which are named the slaves.

The complex factors determining the human response to vibrations and the paucity of consistent quantitative data concerning man's perception of vibration and his reactions to it, are difficult to translate in generally recognizable criteria of comfort or discomfort. However, when the intensity, frequency and duration of the vibration at several locations in the cabin, and also consequences of such vibrations like visible vibration of passenger seats or tables are judged by a variety of passengers in comfort or discomfort, acceptance criteria can be derived. From a survey of many aircraft an acceptable maximum level of the energy of the vibration at several locations in the cabin was established.

During first flights of Fokker 50 series aircraft, which is a twin engine propeller-driven passenger aircraft, it appeared that some of the aircraft would expose future passengers to uncomfortable vibrations. With the help of above mentioned acceptance criteria, the influence of modified vibration engine isolators was investigated. Also investigated was the influence of minimizing the propeller mass unbalance. Results of both investigations indicated that the vibration level could be reduced for the given new-built aircraft. However, after delivery of the aircraft to the operator maintenance of the aircraft would change the configuration, for example by the replacement of a propeller. Therefore the cause of vibrations and noise in the cabin which affect passenger comfort in a negative way, had to be solved more fundamentally.

A further reason to proceed investigations was the observation that despite modified isolators and minimized unbalanced, during flight after an engine shut down and relight a period of sufficiently low energy level of vibrations before the shut-down was succeeded by a period with a higher level after the relight, and vice versa. Continued measurements during flight tests whereby the phase relationship between the two propellers of the aircraft was controlled by the propeller synchrophase system, showed a relation between the vibration level and the changes of the position of the blades of the starboard propeller with respect to the blades of the port propeller. From these observations distinctions in detail were made between the vibration and noise level in the cabin before and after the synchrophase system had readjusted upon a disturbance the required phase relationship between both propellers.

By measurements of the relation between the vibration levels in the cabin and the relative position of the blades of the right hand propeller versus the left hand propeller, it was found that when the position of a particular blade of one propeller and the position of a particular blade of the other propeller were synchrophased, the vibration level in the cabin showed a minimum. Also the contrary was measured, namely that a maximum vibration level could occur by synchrophasing two particular other blades. The findings were worked out in an add-on system of the prior art propeller synchrophase system to arrange that the add-on system in conjunction with the synchrophase system selects automatically the pair of blades from the propellers of the aircraft that gives the minimum vibration level in the cabin, and through that an improved comfort for crew and passengers. The add-on system does not effect the above mentioned specific function of the synchrophase system itself.

More specifically the invention provides a system for reducing vibrations in the cabin of an aircraft driven by two or more propellers each having n blades (n being an integer equal or larger than 2) of which the relative phase angle can be adjusted, said system comprising
synchrophase means for adjusting said relative phase angle such that a predetermined relative phase angle is maintained, characterized in that the system furthermore comprises
means for supplying information about the vibration level at one or more positions within the cabin or thereto related information and for generating a thereto corresponding level signal, and
a control unit which in response to said level signal supplies an error signal to the synchrophase means causing the synchrophase means to adjust the blades of the various propellers such that a new relative phase angle is maintained which differs $m.(2\pi/n)$ radians (m being an integer) from the previous relative phase angle.

The system according to the invention offers the possibility to phase lock both propellers such that not only a predetermined phase relation is maintained between the propeller blades of both propellers in general, but more specifically a predetermined phase relation is maintained between a particular blade of one propeller and a particular blade of another propeller.

The invention will be described in more detail in the following part of the description wherein reference is made to the attached drawings.

FIG. 1 is a block diagram illustrating the elements of a propeller blade position regulator according to the present invention.

FIG. 2 is a block diagram showing in more detail than FIG. 1 an embodiment of a propeller synchrophase system according to the invention.

FIG. 3 illustrates schematically the possible angular position combinations of two 6-blade propellers in which the same phase relation between the propeller blades in general is maintained.

FIG. 4 shows a schematic curve of the change of the vibration level of a hard point in the cabin as function of the six successive blade combinations of two six-blade propellers.

Figure 5:
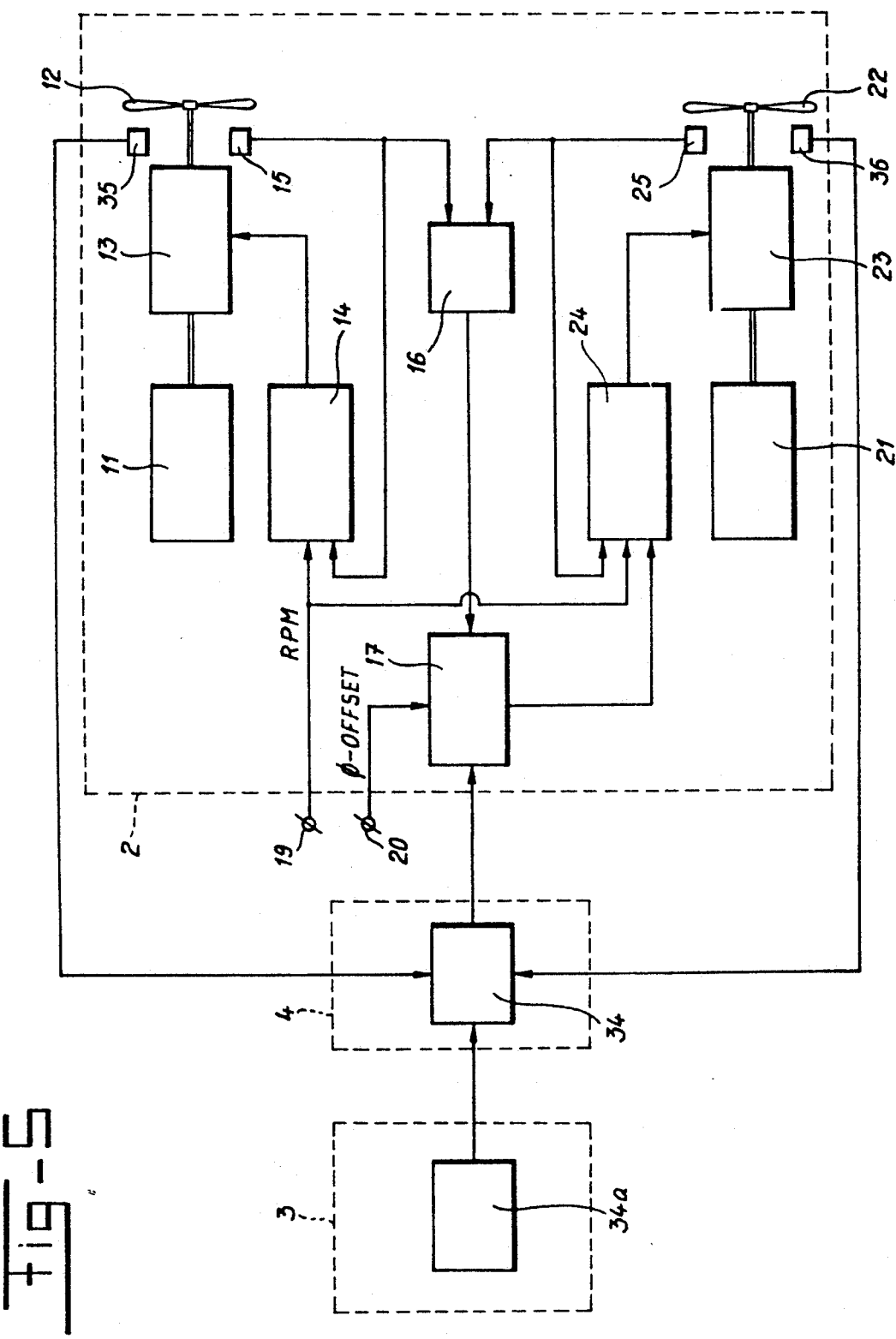
FIG. 5 is a block diagram showing in more detail than FIG. 1 another embodiment of a similar phase system according to the invention.

As shown in FIG. 1 the propeller blade position control system 1 consists of a conventional synchrophase system 2, a source of vibration level data 3, providing vibration level data about one or more positions of the aircraft structure, and a control unit 4. The vibration level data source may comprise one or more transducers or pick-ups and a device or devices to amplify the amplitude or level of the vibration signal. The sensed signals of the measuring equipment are supplied via line 5 to the control unit 4. The unit 4 analyses the signals in agreement with one of a number of possible algorithms, some of which will be described in more detail. If for instance the signal exceeds a predetermined level during a predetermined time period, the control unit 4 generates a command signal which is led through line 6 to the synchrophase system. The system 2 will change the existing combination of blades which are synchrophased whereby a momentary out-of-phase position of the propellers shall be as short as possible.

In other embodiments the vibration level data source comprises a memory in which information is stored about the particular angular phase relation of both propellers which results into a minimum vibration level in the cabin. Specific examples of both types of embodiments will be explained hereinafter.

FIG. 2 illustrates schematically a propeller blade position controller according to the invention, destined for a twin-propeller aircraft. To indicate the correspondence between the general block diagram in FIG. 1 and the more detailed block diagram in FIG. 2 the main sections illustrated in FIG. 1 are again illustrated in dashed lines in FIG. 2.

In FIG. 2 the engines 11 and 21 are connected to the respective propellers 12 and 22 through their hydromechanical propeller blade pitch control mechanisms which are separately indicated by 13 and 23. The rotational speed of each engine-propeller combination is controlled by a controller indicated with reference numbers 14 and 24 respectively. Both controllers 14 and 24 receive an input signal RPM from the terminal 19 representing the desired nominal number of revolutions per minute to which the propellers should be adjusted. The blade passing frequency is registered by the detectors 15 and 25 respectively. Both detectors deliver their signals to the respective controllers 14 and 24 in which these signals are compared with the ROM-signal and in which, if necessary, control signals are generated to be supplied to the respective blade pitch control mechanisms 13 and 23. Further both detectors deliver their signals to a phase comparator 16. If there is a measurable difference in phase angle between both propellers, the comparator 16 generates a phase difference dependent signal which is supplied to a processor 17. The processor 17 receives furthermore a phase offset signal from terminal 20. If the measured phase difference deviates from the value given by the phase offset input 20, a conditioned error signal is delivered to the speed controller 24. The speed controller 24 will respond to the error signal and will cause a momentary increase or decrease in the speed of propeller 22 such that the phase difference of the signals measured by the detectors 15 and 25 is adjusted to the offset value received on terminal 20. The RPM-signal on terminal 19 and the phase offset-signal $\phi$-offset on terminal 20 are generated by other systems in the aircraft as is known to the expert.

The components 11–25 of the synchrophase system described so far are in fact completely known from the prior art. Further details about the functioning of this part of the system can be found in the above mentioned publications.

The system illustrated in FIG. 2 comprises furthermore within the dashed frame 3 a number of vibration detectors 30, 31, 32 and 33 destined to measure the vibration level at different positions in the cabin of the airplane. (The actual number of detectors can be selected by the user). The signals generated by these vibration detectors are supplied to a processor 34 in which the received signals are processed according to a predetermined algorithm. The processor 34 has the same function as the control unit 4 in FIG. 1. If the processor 34 decides that the momentary angular position combination of the blades of both propellers still results in a general vibration level in the cabin above a predetermined reference level, then the processor 34 will supply a control signal to the processor 17 causing said processor to provide a signal to the controller 24. The controller 24 will respond to the signal and will cause a momentary increase or decrease in the speed of propeller 22 such that the propellers will become phase locked in another angular position combination.

FIG. 3 illustrates the various angular position combinations of the two propellers whereby the same mutual phase relationship is maintained. Each propeller has six blades and one of the blades, blade 40 of propeller 1 and blade 41 of propeller 2, is shaded in FIG. 3 and will act as reference blade. It will be clear from FIG. 3 that in each of the six possible angular position combinations both propellers have the same phase relation although, if the blades are considered as different individual components, the six illustrated combinations are different. All prior art synchrophase systems try to maintain a predetermined phase relation between both propellers without looking at the individual blades of the propellers. The system according to the underlying invention however takes the individual blades into account. In other words, the prior art systems try to maintain a predetermined phase angle $\phi$ between the propeller blades whereby $0<\phi<2\pi/n$ (n being the number of blades), whereas the herein described systems will try to maintain a predetermined phase angle $\phi$ between the propeller blades whereby $0<\phi<2\pi$.

The advantages of the system according to the invention can be made clear with reference to FIG. 4 which shows an example of a recording of the vibration level measured with a sensor at a location at the seat rail in the floor of the cabin of the Fokker 50 which was used for the experiments. As already indicated above the Fokker 50 has 6-blade propellers and as explained above a predetermined phase angle between both propellers can be maintained with six different angular position combinations of the blades of both propellers. Shown is the relation between the vibration level and the six combinations between the blades of the first propeller and the blades of the second propeller. The six combinations are indicated by reference numbers 51-56 in FIG. 3 and the same reference numbers are used in FIG. 4. The recording shows a minimum level for the preferable blade combination 52 and a maximum level for combinations 54 and 55.

A practical embodiment of the system according to the invention may operate as follows. After the synchrophase subsystem 2 has reached a phase lock situation wherein both propellers are locked in anyone of the six possible combinations the measuring circuit 3 starts measuring the vibration level. The measured vibration level data is stored in a memory in the processor 34 and said processor generates thereafter a control signal to shift the position of the blades of the controlled propeller $2\pi/n$ radians (=360/n degrees) with respect to the other propeller. Again the vibration level is measured and stored in the memory of the processor 34 whereafter a further control signal will be applied to the processor 17 to cause a further $2\pi/n$ radians shift of the propeller blades. In this way the vibration level is measured for all six propeller blade combinations. Based on the stored data the processor 34 finally generates the ultimate control signal causing a phase shift of $m(2\pi/n)$ radians whereby m is selected by the processor 34 between 0 and 5 such that the combination with minimum vibration level (combination 52 in the above example) will be selected and maintained.

In the above described example it is more or less assumed that only one vibration level sensor was active within the vibration level data source 3. In practical embodiments, however, a number of sensors will be installed within the cabin and the signals delivered by those sensors will be combined according to a predetermined algorithm. In the example illustrated in FIG. 2 there are 4 sensors which are preferably installed at various representative locations within the cabin. It is for instance possible to determine the sum or the average of the various signals, which sum or average is used in the processor 34 as criterium to decide on. However, it is also possible to use a priority scheme in which the signal from predetermined sensors are given a higher weight than the signals from other sensors. The development of suitable algorithms for processing a number of signals derived from various sensors is considered within reach of the expert in this field.

In another embodiment of the invention the system is engaged as soon as after the take-off of the aircraft the synchrophase system is activated. The processor 34 in control unit 4 compares the sensed momentary vibration level in the cabin with a prefixed reference value. In case there is a substantial difference in value, the processor 34 presents a command signal proportional to $2\pi/n$ radians (360/n degrees) to the processor 17. In reaction the synchrophase system will change the speed of propeller 22 by fining the blade pitch, such that the position of the blades of that propeller will be shifted 360/n degrees with respect to the blades of the other propeller 12. The time the shift will take is mainly determined by the size and the weight of the propeller. When the standard phase off-set between the propellers is re-adjusted and the vibration level in the cabin is not yet equal or below the prefixed reference value, the described action by the processor 34 is repeated until the first blade combination for which the vibration level in the cabin is equal or below the maximum level is established.

In yet another embodiment of the invention, which is separately illustrated in FIG. 5, the processor 34 is coupled to a memory 34a in which the combination of the position of propeller blades is stored which gives an minimum vibration and noise level. The respective information can be obtained for instance in the above described manner during a test flight. Furthermore the system comprises two additional sensors 35 and 36 destined to detect the actual position of the reference blades 40 and 41 respectively. Both sensors supply a signal to the processor 34. As soon as the synchrophase system has reached a stable condition in which propeller 22 is phase locked to propeller 12 the processor 34 determines which of the six possible angular propeller blade combinations is momentarily selected by the synchrophase system. This is done by evaluating the signals received from the additional sensors 35 and 36. Thereafter the processor 34 calculates the difference angle between the momentary combination and the preferred combination and generates a corresponding error signal to the processor 17 causing the synchrophase system to lock both propellers in the preferred combination. Dependent on the actual calculated phase difference the error signal may result either into a momentary decrease or in a momentary increase of the rotational speed of propeller 22 to reach the preferred combination. In the case the control unit finds that the vibration and noise level in the cabin exceeds the level for comfort, a command signal is calculated which shifts the position of one propeller with respect to the other propeller at one go from the "uncomfort position" to the "comfort position".

In yet a further embodiment of the invention the add on system is engaged as soon as after the take-off of the aircraft the synchrophase system is activated. Said control unit 4 determines the combination of blades for minimum vibration level in the cabin and measures the vibration level for all other combinations. An alert limit is calculated from the average of the maximum and the minimum value and the minimum value. The next step of the control unit is to generate a first command signal to the synchrophase system if the momentary vibration level is above the alert limit. Upon the first command signal, the synchrophase system shall shift the blade combination to the combination for minimum vibration. Hereafter the control unit continuously compares the measured, momentary vibration level with the alert limit. If this limit is exceeded, a second command signal is generated. And so on. The control unit will verify from time to time whether the selected blade combination for minimum vibration level still provides the minimum vibration level. If this is no longer the case, the unit will repeat the selection procedure for the best blade combination.

An experimental embodiment of the above described blade matching system was tested in an Fokker 50 series aircraft. This test system had facilities to operate in three different modes, i.e. a step by step mode, a continuous mode, and an auto minimum mode. Before the system starts functioning in one of the selected modes the system checks first of all if the number of revolution per minutes of both propellers (the Fokker 50 series aircraft has two propellers) are within a predetermined window, which window is specific for cruise flight conditions. Thereafter the cockpit crew selects one of the above mentioned modes with the following result:

1) Step by step mode.

By selecting this mode the system is instructed to carry out a one blade shift operation. After a predetermined stabilization period (of for instance 10 seconds) the propellers are stable in their new mutual relation and if necessary the crew may operate the system once more to carry out a further blade shift operation.

2) Continuous mode.

In this mode the crew has the possibility to start a sequential blade shift operation whereby with predetermined intervals of for instance 30 seconds a blade shift operation is carried out. This continuous mode is for instance useful for measuring the vibration level at the different relative phase angles and accumulating the respective measured values in a memory for further use.

3) The auto minimum mode.

In this mode a number of sequential steps are carried out:

1. First of all the system checks if the number of revolutions per minute is within the predetermined window, which window is representative for normal cruise conditions. If this is true then step 2 is carried out.
2. The system waits for a predetermined period of for instance 10 seconds to be sure that the propellers have stabilized.
3. With predetermined intervals of for instance 10 seconds the vibration level is measured at predetermined different positions in the cabin of the airplane. The measured values are stored in a memory.
4. After three samples measured in step 3. the average vibration level is calculated and the calculated results are stored in a memory.
5. If the average vibration level, calculated in step 4. is above a predetermined threshold level then step 6. is carried out. Otherwise the process goes back to step 3.
6. With predetermined time intervals a number of blade phase shift instructions is provided to the system to carry out an equal number of blade shift operations. The length of the above mentioned time intervals is sufficient to provide for a first interval section in which the actual blade shifting is carried out, a second interval section in which the engines are enabled to stabilize and a third interval in which the various samples are measured from which an average value is calculated.
7. The calculated average sample values are stored in a memory. Altogether values are stored for each of the different relatives phase angles.
8. The minimum of all stored average values is calculated.
9. A number of blade phase shift operations is carried out, the number being selected such that the propellers are adjusted to such a phases angle that the minimum vibration level, calculated in step 8., is obtained.
10. With predetermined time intervals of for instance 10 seconds the vibration level is sampled.
11. The average value of three samples taken in step 10. is calculated.
12. a. If the average value, calculated in step 11. is smaller than or equal to a first limit value then the process switches back to step 10.
  b. If the average value, calculated in step 11, exceeds the minimum level calculated in step 8. with a predetermined tolerance value than the process switches back to step 6.
  c. If the calculated average value is larger than a second threshold value after a predetermined time interval of for instance 5 minutes, then the process switches back to step 6.
  d. If the average value calculated in step 8. is larger than a further limit value after a further time interval of for instance 15 minutes then the process switches back to step 6.
13. Go to step 10.

Although above various embodiments are described in which it is assumed that the aircraft has two propellers it will be clear that the invention can be applied also in case another number of propellers is used. In general the inventive system can be applied to an aircraft having m propellers each comprising n blades. The number of possible angular position combinations can be expressed in general as $n^{m-1}$. For an aircraft with four 6-blade propellers the number of possible combinations would be $6^3 = 216$. In such a case it would be very time consuming to measure the vibration level for each of these combinations. Therefore it is preferable under those circumstances to use an embodiment in which the momentary position of all propellers is detected and compared with the desired preferred combination which is stored in a memory whereafter calculated error signals are supplied to the controller of the synchrophase system to lock each propeller in the preferred combination.

I claim:

1. A system for reducing vibrations in the cabin of an aircraft driven by a plurality of propellers each propeller having n blades n being a plural integer said system comprising:
   a) synchrophase means to adjust the rotation of said propellers to maintain a predetermined relative phase angle;
   b) vibration-measurement means to measure the vibration level at one or more positions within the cabin and generate a vibration level signal corresponding thereto;
   c) a control unit responsive to said vibration level signal to generate an error signal to control said synchrophase means said control unit comprising:
      means to shift said propellers relatively from said predetermined relative phase angle through $m.(2''/n)$ radians where "m" is an integer to a new relative phase angle where said propellers are substantially in phase and have new relative blade positions; and
      means to select between said predetermined and said new relative phase angles for an improved cabin vibration level.

2. A system according to claim 1 wherein said control unit comprises means to compare said measured vibration level with a reference value and to activate said means to shift said propellers to said new relative phase angle when said measured vibration level exceeds said reference value.

3. A system according to claim 2 wherein said control unit comprises means to shift said propellers to n in-phase positions and to select an optimum low-vibration phase position from said n positions.

4. A system according to claim 1 wherein said control unit includes memory means and a predetermined reference value vibration level stored in said memory means, said predetermined value having been previously ascertained as an achievable low threshold value.

5. A system according to claim 1 wherein said vibration measurement means comprises one or more vibration sensors installed in the aircraft.

6. A system according to claim 1 comprising a plurality of position detectors, one for each propeller, each said position detector being operative to detect the position of a specific blade of its respective propeller.

7. A system according to claim 1 wherein said aircraft has two propellers each of which has six blades.

8. A system for reducing vibrations in the cabin of an aircraft driven by a plurality of propellers each propeller having a plurality of blades which system comprises:
   a) a propeller drive system comprising an engine and pitch control mechanism for each propeller;
   b) a speed controller operable to control the speed of each said propeller drive system;
   c) a blade passing frequency detector for each propeller outputting a blade passing signal to a respective speed controller;
   d) a phase comparator receiving input from each blade passing signal detector and generating a phase-difference signal indicating a relative phase angle between a first blade of one propeller and a reference blade of another propeller;
   e) a signal processor inputting said phase-difference signal; and
   f) vibration detectors measuring vibration in said cabin and outputting a vibration level signal to said signal processor;

said signal processor outputting an adjustment signal to at least one of said speed controllers to optimize said relative phase angle to a first value at which said measured vibration level is reduced and said propellers are rotating with a desired phase relationship between said first blade of said one propeller and said reference blade of said other propeller, wherein said signal processor includes a threshold vibration level stored in memory and is operative, in response to said first value being in excess of said stored threshold value, to cause said one speed controller to shift said one propeller to bring each blade in turn into phase with said reference blade of said other propeller by means of said vibration-level-dependent adjustment signal, producing a number of values of said measured vibration level, one for each blade of said one propeller, and is further operative to select a phase relationship providing a minimum measured vibration level.

9. A system for reducing vibrations in a cabin of an aircraft driven by two or more propellers each having n blades ("n" being an integer equal to or larger than 2), said propellers having a relative, adjustable phase angle, wherein said system comprises:
   a) synchrophase means for adjusting said relative phase angle to maintain a predetermined relative phase angle;
   b) vibration-monitoring means responsive to a vibration level at one or more positions within the cabin to generate a corresponding vibration level-related signal; and
   c) a control unit supplying an error signal to said synchrophase means in response to said vibration level-related signal, said synchrophase means acting in response to said error signal to adjust said predetermined relative phase angle to a new relative phase angle providing a reduced vibration level;

wherein said new relative phase angle differs by $m.(2\sim/n)$ radians ("m" being an integer) from said predetermined relative phase angle.

10. A system according to claim 9, wherein said control unit receives said vibration-level related signal during monitoring of vibration levels for n different angular position combinations of said propeller blades, said predetermined phase angle being maintained during said position combinations.

11. A system according to claim 10, wherein said control unit comprises means to compare a monitored vibration value derived from said vibration-related signal with a prefixed reference vibration value, means to determine therefrom an optimum angular position combination of said propeller blades, and means to supply said error signal to said synchrophase means in the case of a substantial difference in value between said reference vibration value and said monitored vibration value.

12. A system according to claim 10, wherein said control unit comprises means to determine from said vibration-related signal an angular position combination of said propeller blades causing a minimum vibration value, said control unit supplying a control signal to said synchrophase means to adjust the predetermined relative phase angle to a new relative phase angle corresponding to said minimum vibration value.

13. A system according to claim 9, wherein said vibration-monitoring means comprises a number of vibration level sensors all supplying vibration level data to said control unit, and wherein said control unit includes means to analyze said vibration level data according to a predetermined algorithm.

* * * * *